United States Patent
Tatei et al.

(10) Patent No.: US 12,203,778 B2
(45) Date of Patent: Jan. 21, 2025

(54) POSITION DETECTOR AND LINEAR TRANSPORT APPARATUS

(71) Applicant: Mitsubishi Electric Corporation, Tokyo (JP)

(72) Inventors: Yoshinao Tatei, Tokyo (JP); Takeshi Musha, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/566,104

(22) PCT Filed: Jul. 8, 2021

(86) PCT No.: PCT/JP2021/025737
§ 371 (c)(1),
(2) Date: Dec. 1, 2023

(87) PCT Pub. No.: WO2023/281687
PCT Pub. Date: Jan. 12, 2023

(65) Prior Publication Data
US 2024/0240969 A1    Jul. 18, 2024

(51) Int. Cl.
*G01D 5/14* (2006.01)
(52) U.S. Cl.
CPC ......... *G01D 5/145* (2013.01); *G01D 2205/18* (2021.05); *G01D 2205/40* (2021.05)
(58) Field of Classification Search
CPC .................................................. G01D 5/145
See application file for complete search history.

(56) References Cited

U.S. PATENT DOCUMENTS

| | | | | |
|---|---|---|---|---|
| 6,900,713 B2 * | 5/2005 | Kasashima | ............ | H03K 17/97 335/207 |
| 9,279,866 B2 * | 3/2016 | Ogomi | .................... | G06K 7/087 |

(Continued)

FOREIGN PATENT DOCUMENTS

| | | |
|---|---|---|
| JP | H03-222669 A | 10/1991 |
| JP | H05-074160 U | 10/1993 |

(Continued)

OTHER PUBLICATIONS

International Search Report and Written Opinion mailed on Aug. 17, 2021, received for PCT Application PCT/JP2021/025737, filed on Jul. 8, 2021, 13 pages including English Translation.

(Continued)

*Primary Examiner* — Reena Aurora
(74) *Attorney, Agent, or Firm* — XSENSUS LLP (57) ABSTRACT

A position detector includes a position detection magnet unit installed at each of a plurality of carriers, and a position detection unit. The position detection magnet unit includes a plurality of magnets disposed such that different magnetic poles are arranged alternately in a transport direction of the carriers, and side magnetic shielding portions installed at the ends of the position detection magnet unit. The position detection unit includes: a processing substrate disposed in parallel to the transport direction of the carriers; a plurality of magnetic detection elements disposed side by side in the transport direction of the carriers on a front side of the processing substrate; and a substrate-side magnetic shielding portion opposite the magnetic detection elements, the substrate-side magnetic shielding portion being installed on a back side of the processing substrate.

12 Claims, 7 Drawing Sheets

(56) References Cited

U.S. PATENT DOCUMENTS

| | | |
|---|---|---|
| 2010/0186618 A1 | 7/2010 | King et al. |
| 2011/0226950 A1 | 9/2011 | Tanaka et al. |
| 2014/0320058 A1 | 10/2014 | Takagi |
| 2016/0041005 A1 | 2/2016 | Shimizu et al. |

FOREIGN PATENT DOCUMENTS

| | | |
|---|---|---|
| JP | 2004-166401 A | 6/2004 |
| JP | 2011-061995 A | 3/2011 |
| JP | 2011-193703 A | 9/2011 |
| JP | 2013-090417 A | 5/2013 |
| JP | 2013-102570 A | 5/2013 |
| JP | 2014-178283 A | 9/2014 |
| JP | 2015-534436 A | 11/2015 |

OTHER PUBLICATIONS

Office Action received for Korean Patent Application No. 10-2023-7043966, mailed on Mar. 20, 2024, 8 pages.

\* cited by examiner

POSITION DETECTOR AND LINEAR TRANSPORT APPARATUS

CROSS-REFERENCE TO RELATED APPLICATION

This application is based on PCT filing PCT/JP2021/025737, filed Jul. 8, 2021, the entire contents of which are incorporated herein by reference.

FIELD

The present disclosure relates to a position detector that detects the positions of movers equipped with magnets and a linear transport apparatus.

BACKGROUND

A linear motor including movers and a stator is used as a drive mechanism of a linear transport apparatus for transporting articles. Patent Literature 1 discloses a linear transport apparatus including a plurality of carriers. In the linear transport apparatus disclosed in Patent Literature 1, a mover is provided at the bottom of each carrier. The linear transport apparatus disclosed in Patent Literature 1 includes one stator and a plurality of movers. Each carrier is provided with permanent magnets as the mover having different magnetic poles disposed alternately. Hall elements for detecting the magnetic fields of the permanent magnets are provided on a transport rail having the stator consisting of coils installed thereon. The permanent magnets of the carriers and the Hall elements on the transport rail form a position detector. The Hall elements detect the magnetic fields to thereby allow the linear transport apparatus disclosed in Patent Literature 1 to detect the positions of the carriers.

CITATION LIST

Patent Literature

Patent Literature 1: Japanese Patent Application Laid-open No. 2013-090417

SUMMARY OF INVENTION

Problem to be Solved by the Invention

When carriers of the linear transport apparatus disclosed in Patent Literature 1 approach each other and the interval between the carriers becomes small, the magnets mounted on the individual carriers magnetically interfere with each other. If the magnets mounted on the carriers magnetically interfere with each other, the Hall element on the transport rail undesirably detects the magnetic field of the magnets of the carrier that is not a target having its position to be detected while that Hall element should detect the magnets of the carrier that is a target having its position to be detected. As a result, the linear transport apparatus disclosed in Patent Literature 1 will provide the result of detection of the position varying depending on whether a carrier that is not the position detection target is near the carrier that is the position detection target, even if the position of a carrier that is the position detection target remains the same. For this reason, the linear transport apparatus disclosed in Patent Literature 1 provides the decreased accuracy of carrier position detection when carriers approach each other.

The present disclosure has been made in view of the above. It is an object of the present disclosure to provide a position detector that can prevent a decrease in position detection accuracy even when carriers approach each other.

Means to Solve the Problem

To solve the above-described problem and achieve the object, a position detector according to the present disclosure comprises: a position detection magnet unit installed at each of a plurality of carriers equipped with a mover; and a position detection unit installed at a transport rail equipped with a stator. The position detection magnet unit includes: a plurality of magnets disposed such that different magnetic poles are arranged alternately in a transport direction of the carriers; and side magnetic shielding portions installed at ends of the position detection magnet unit in the transport direction of the carriers. The position detection unit includes: a processing substrate disposed in parallel to the transport direction of the carriers; a plurality of magnetic detection elements disposed side by side in the transport direction of the carriers on a front side of the processing substrate, the front side being a surface facing the carriers; and a substrate-side magnetic shielding portion opposite the magnetic detection elements, the substrate-side magnetic shielding portion being installed on a back side of the processing substrate, the back side being a surface opposite to the front side that is the surface facing the carriers.

Effects of the Invention

Advantageous Effects of Invention

The position detector according to the present disclosure has the effect of preventing the decrease in position detection accuracy even when the carriers approach each other.

DESCRIPTION OF EMBODIMENTS

A position detector and a linear transport apparatus according to embodiments will be hereinafter described in detail with reference to the drawings.

First Embodiment

Figure 1:
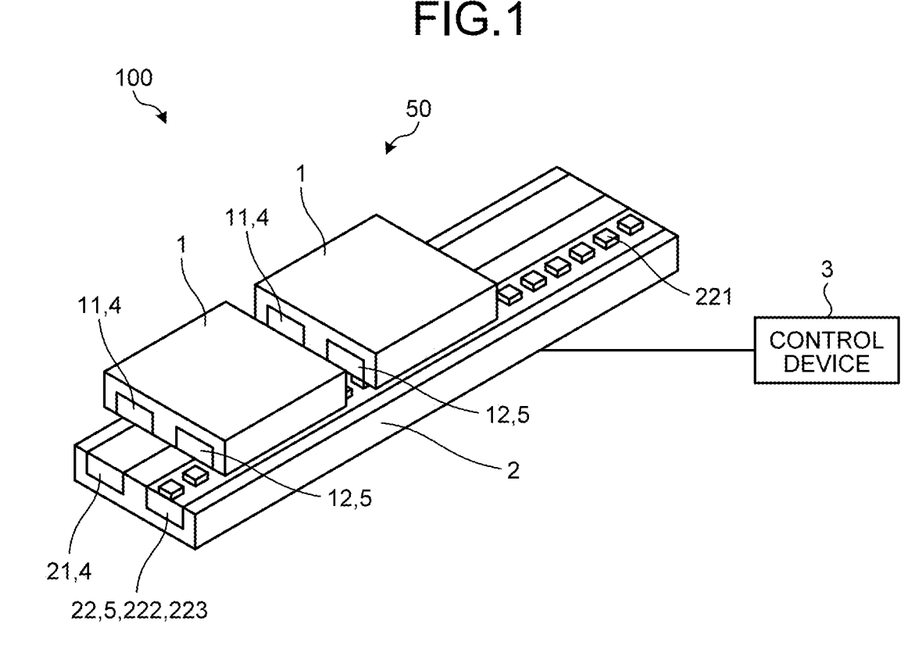
FIG. 1 is a diagram illustrating a configuration of a linear transport system according to a first embodiment.
Figure 2:
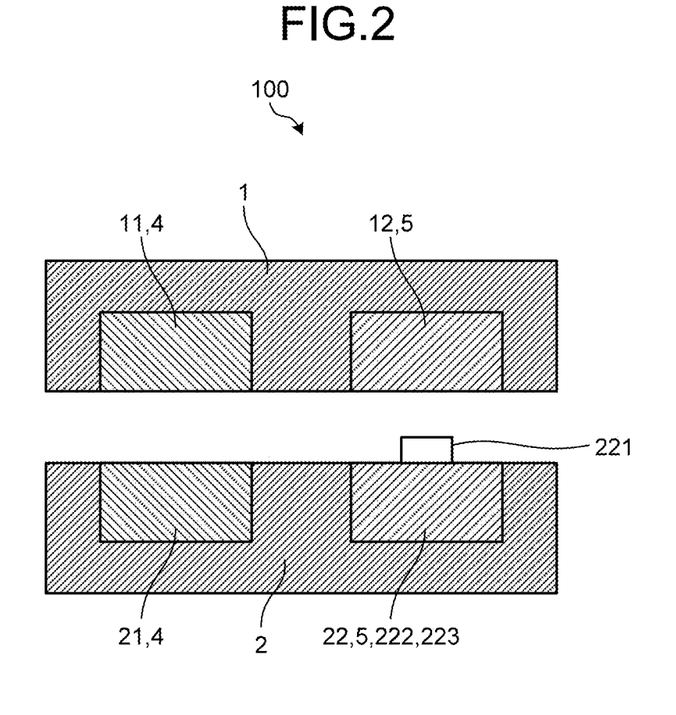
FIG. 2 is a cross-sectional view of a linear transport apparatus according to the first embodiment perpendicular to a carrier transport direction.

FIG. 1 is a diagram illustrating a configuration of a linear transport system according to a first embodiment. FIG. 2 is a cross-sectional view of a linear transport apparatus according to the first embodiment perpendicular to a carrier transport direction. A linear transport system 50 according to the first embodiment includes a linear transport apparatus 100 and a control device 3. The linear transport apparatus 100 includes a plurality of carriers 1 to carry articles on their top surfaces and a transport rail 2 to move the carriers 1 in a transport direction. The control device 3 is to control the movements of the carriers 1. Each carrier 1 includes a mover 11 to generate a magnetic field for driving, and a position detection magnet unit 12 to generate a magnetic field for position detection. The transport rail 2 includes a stator 21 to generate a magnetic field for driving, and a position detection unit 22 to detect the positions of the movers 11. The movers 11 and the stator 21 form a linear motor 4. The position detection magnet units 12 and the position detection unit 22 form a position detector 5.

The carriers 1 having articles, i.e., transportation targets loaded thereon move in the transport direction to thereby transport the articles. The carriers 1 can hold articles, i.e., transportation target, hanging or sucking the articles.

Figure 3:
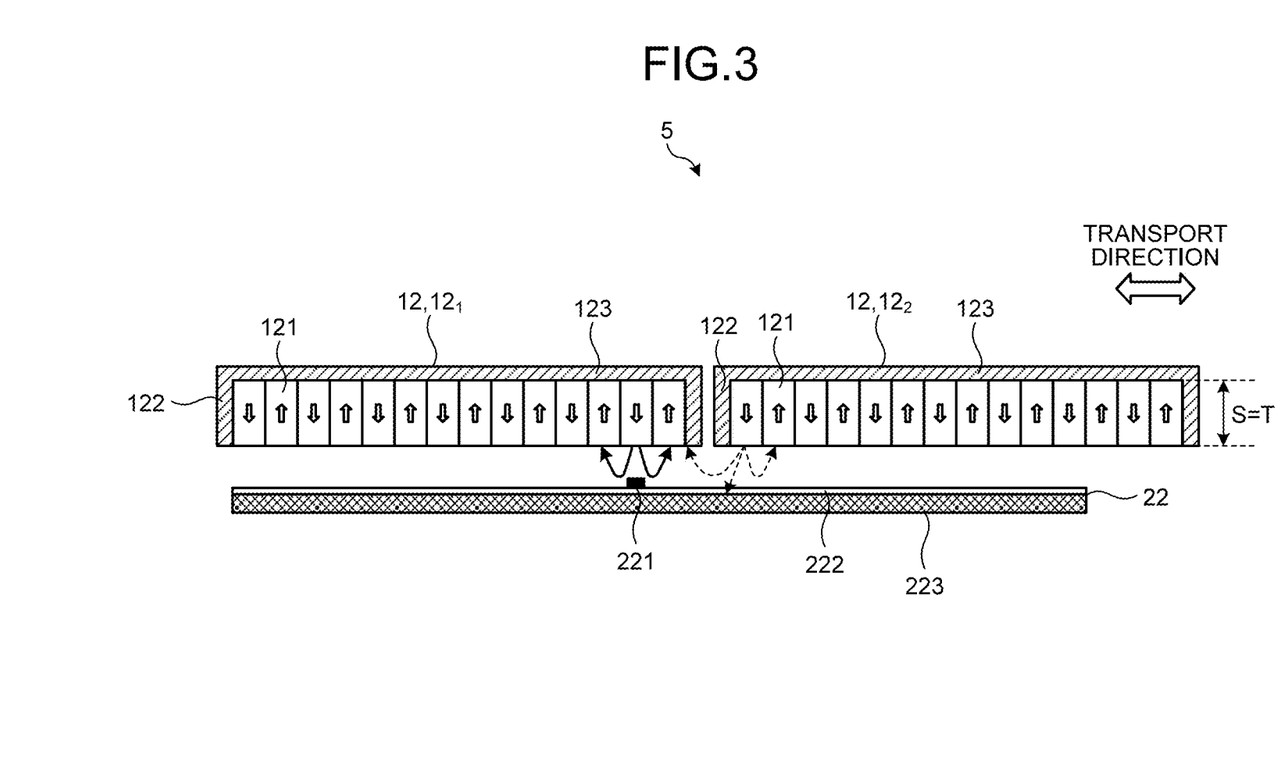
FIG. 3 is a side view of a position detector of the linear transport apparatus according to the first embodiment.

FIG. 3 is a side view of the position detector of the linear transport apparatus according to the first embodiment. The linear transport apparatus 100 includes two carriers 1. Thus, the position detector 5 includes two position detection magnet units $12_1$ and $12_2$. In the following description, these two position detection magnet units will be referred to as "position detection magnet units $12_1$ and $12_2$," when distinguished from each other, and as "position detection magnet units 12" when not distinguished from each other. The position detection magnet unit 12 includes a plurality of magnets 121, side magnetic shielding portions 122, and a back magnetic shielding portion 123. The magnets 121 are arranged in the transport direction of the carriers 1. The side magnetic shielding portions 122 are provided on opposite sides of the position detection magnet unit 12 in the transport direction of the carriers 1. The back magnetic shielding portion 123 installed covering a back side of the plurality of magnets 121. The back side of the magnets 121 is a surface opposite to a front side of the magnets 121. The front side of the magnets 121 is a surface facing the transport rail 2. In the first embodiment, the magnets 121 have a thickness T in a direction from the front side to the back side of the magnets 121, which direction is perpendicular to the transport direction of the carriers 1. The thickness T of the magnets 121 is the same as the length S of the side magnetic shielding portions 122. In FIG. 3, solid arrows indicate a magnetic field generated by the magnet 121 of the position detection magnet unit $12_1$. In FIG. 3, dashed arrows indicate a magnetic field generated by the magnet 121 of the position detection magnet unit $12_2$. In FIG. 3, white arrows in the magnets 121 indicate the directions of magnetic fields inside the magnets 121.

The plurality of magnets 121 is arranged in the transport direction of the carriers 1 such that different magnetic poles are disposed alternately. That is, for the plurality of magnets 121 illustrated in FIG. 3, the magnet 121 having one magnetic field direction and the magnet having a different magnetic field direction are arranged alternately in the transport direction of the carriers 1. In the linear transport apparatus 100 according to the first embodiment, fourteen magnets 121 are arranged in the transport direction of the carriers 1. The magnet 121 can be a single-piece magnetic material having a plurality of magnetic poles formed in the transport direction of the carriers 1.

The side magnetic shielding portions 122 and the back magnetic shielding portion 123 are formed using a material having a magnetic permeability that exceeds one, such as iron. The position detection unit 22 includes a processing substrate 222, a plurality of magnetic detection elements 221, and a substrate-side magnetic shielding portion 223. The processing substrate 222 is installed in parallel to the transport direction of the carriers 1. The plurality of magnetic detection elements 221 is disposed on a front side of the processing substrate 222. The front side of the processing substrate 222 is a surface facing the carriers 1 along the transport direction of the carriers 1. The substrate-side magnetic shielding portion 223 is installed on a back side of the processing substrate 222. The back side of the processing substrate 222 is a surface opposite to the front side that is the surface having the magnetic detection elements 221 mounted thereon. The magnetic detection elements 221 detect magnetic fields generated by the magnets 121 of the position detection magnet units 12. FIG. 3 illustrates only one of the plurality of magnetic detection elements 221 arranged in the transport direction of the carriers 1. A detection target carrier, i.e., a carrier 1 to be detected by the magnetic detection element 221 illustrated in FIG. 3 is the carrier 1 having the position detection magnet unit $12_1$ placed facing the magnetic detection element 221. On the other hand, the magnetic detection element 221 illustrated in FIG. 3 does not face the position detection magnet unit $12_2$, and thus the carrier 1 having the position detection magnet unit $12_2$ is not a target having its position to be detected by the magnetic detection element 221 illustrated in FIG. 3. FIG. 3 illustrates an example in which the substrate-side magnetic shielding portion 223 is installed over the entire back surface of the processing substrate 222.

An electromagnet can be used for one of the mover 11 and the stator 21, and an electromagnets or a permanent magnet can be used for the other. Using the permanent magnet as the mover 11, and the electromagnet as the stator 21 eliminates the need for wiring for connection between the movable plurality of carriers 1 and the control device 3, and prevents that wiring from hindering the movements of the carriers 1.

When the carrier 1 that is not a position detection target, i.e., a target having its position to be detected is away from the carrier 1 that is the position detection target, the magnetic detection element 221 detects only the magnetic field generated by the magnets 121 of the position detection magnet unit 12; of the carrier 1 that is the position detection target.

When the carrier 1 that is not the position detection target becomes near the carrier 1 that is the position detection target, the magnetic sensing element 221 will detect the magnetic field generated by the magnets 121 of the position detection magnet unit $12_2$ of the carrier 1 that is not the position detection target, as long as nothing blocks the magnetic field generated by the magnets 121 of the position detection magnet unit $12_2$ of the carrier 1 that is not the position detection target. As a result, the accuracy of detection of the position of the carrier 1 that is the position detection target will degrade.

In the linear transport apparatus 100 according to the first embodiment, the side magnetic shielding portion 122 is provided at each side of the position detection magnet unit 12 in the transport direction of the carriers 1. The side magnetic shielding portion 122 blocks small-loop-forming magnetic lines of the magnetic force provided by the position detection magnet unit $12_2$ of the carrier 1 that is not the position detection target. As a result, those small-loop-forming magnetic lines do not reach the magnetic detection element 221. Furthermore, the position detection magnet unit 12 is provided with the back magnetic shielding portion 123, and the position detection unit 22 is provided with the substrate-side magnetic shielding portion 223. The back magnetic shielding portion 123 or the substrate-side magnetic shielding portion 223 blocks large-loops-forming magnetic lines of the magnetic force provided by the position detection magnet unit $12_2$ of the carrier 1 that is not the position detection target. As a result, those which form large loops do not reach the magnetic detection element 221.

Figure 4:
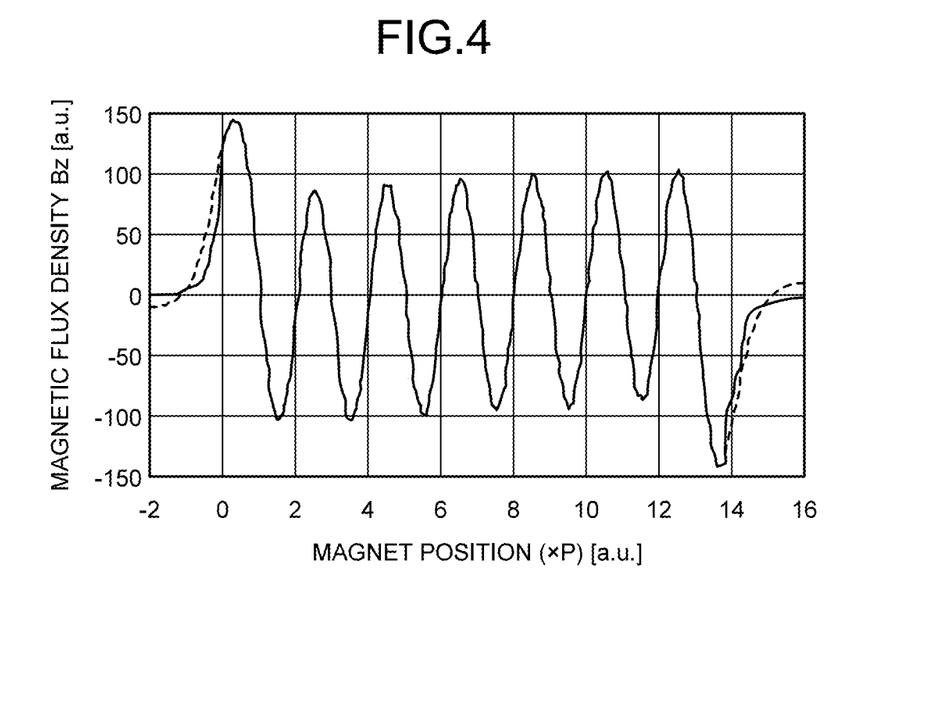
FIG. 4 is a graph illustrating a waveform of the strength of a magnetic field applied to a magnetic detection element by a position detection magnet unit in the linear transport apparatus according to the first embodiment.
Figure 5:
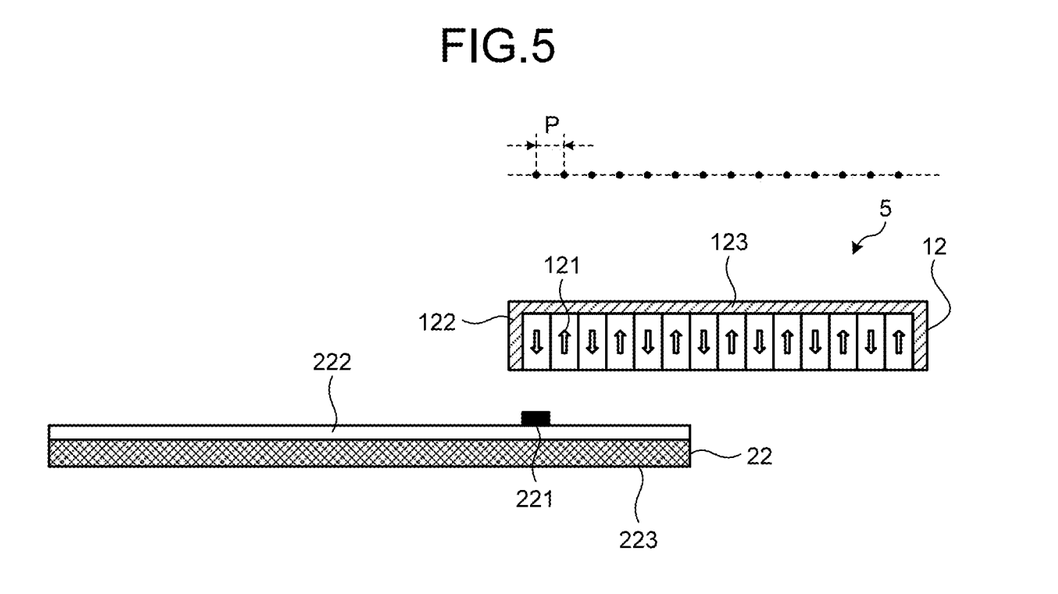
FIG. 5 is a diagram illustrating a positional relationship between the position detection magnet unit and the magnetic detection element of the linear transport apparatus according to the first embodiment.
Figure 6:
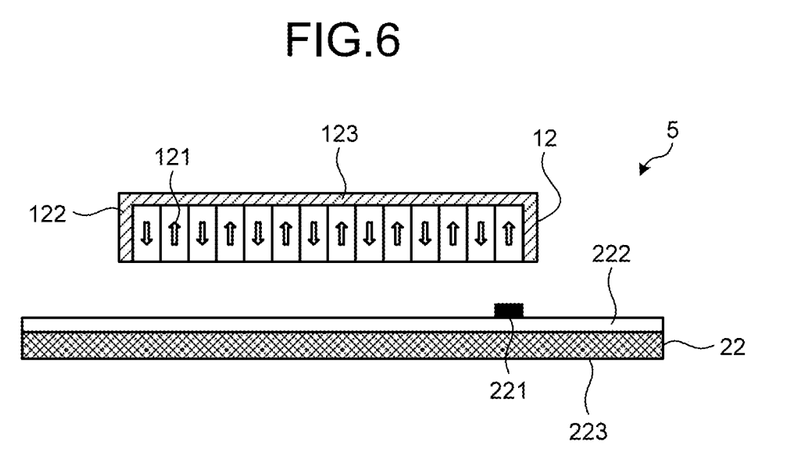
FIG. 6 is a diagram illustrating a positional relationship between the position detection magnet unit and the magnetic detection element of the linear transport apparatus according to the first embodiment.
Figure 7:
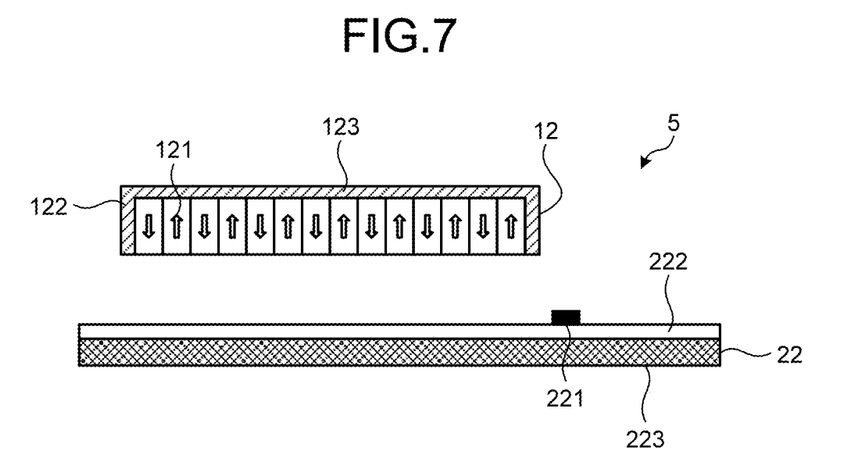
FIG. 7 is a diagram illustrating a positional relationship between the position detection magnet unit and the magnetic detection element of the linear transport apparatus according to the first embodiment.

FIG. 4 is a graph illustrating a waveform of the strength of the magnetic field applied to the magnetic sensing element by the position detection magnet unit in the linear transport apparatus according to the first embodiment. The horizontal axis in FIG. 4 represents the position in the transport direction of the carriers 1. The vertical axis in FIG. 4 represents the relative value of the magnetic flux density normalized with the amplitude at a magnet central portion as 100. A positive direction of the vertical axis in FIG. 4 indicates that the magnetic field is applied in the direction from the front side to the back side of the magnetic sensing element 221. A solid line indicates a waveform of the magnetic field strength in the first embodiment, and a broken line indicates a waveform of the magnetic field strength in a case where the side magnetic shielding portions, the back magnetic shielding portion, and the substrate-side magnetic shielding portion are not provided for comparison with the first embodiment. P is the length of the magnets 121 in the transport direction of each carrier 1. The magnets 121 are aligned at an equal pitch of pitch P. FIGS. 5, 6, and 7 are diagrams illustrating the positional relationship between the position detection magnet unit and the magnetic detection element of the linear transport apparatus according to the first embodiment. In FIGS. 5, 6, and 7, the direction from the front side to the back side of the magnetic sensing element 221 is a downward direction on the sheet. In FIGS. 5, 6, and 7, arrows in the magnets 121 indicate the direction of the magnetic field inside the magnets 121. FIG. 5 illustrates the position detection magnet unit 12 placed in the 0P position. FIG. 6 illustrates the position detection magnet unit 12 placed in the 13P position. FIG. 7 illustrates the position detection magnet unit 12 placed in the 15P position. When the position detection magnet unit 12 is placed in the 15P position, the position detection magnet unit 12 is located 2P away from the magnet end out of the range of position detection. In the linear transport apparatus 100 according to the first embodiment, the position detection magnet unit 12 includes the fourteen magnets 121. Thus, when the position detection magnet unit 12 is placed in the range of 0P to 13P, the magnetic sensing element 221 needs to detect the magnetic field of the position detection magnet unit 12, and does not need to detect the magnetic field of the position detection magnet unit 12 placed outside the range of 0P to 13P.

Figure 8:
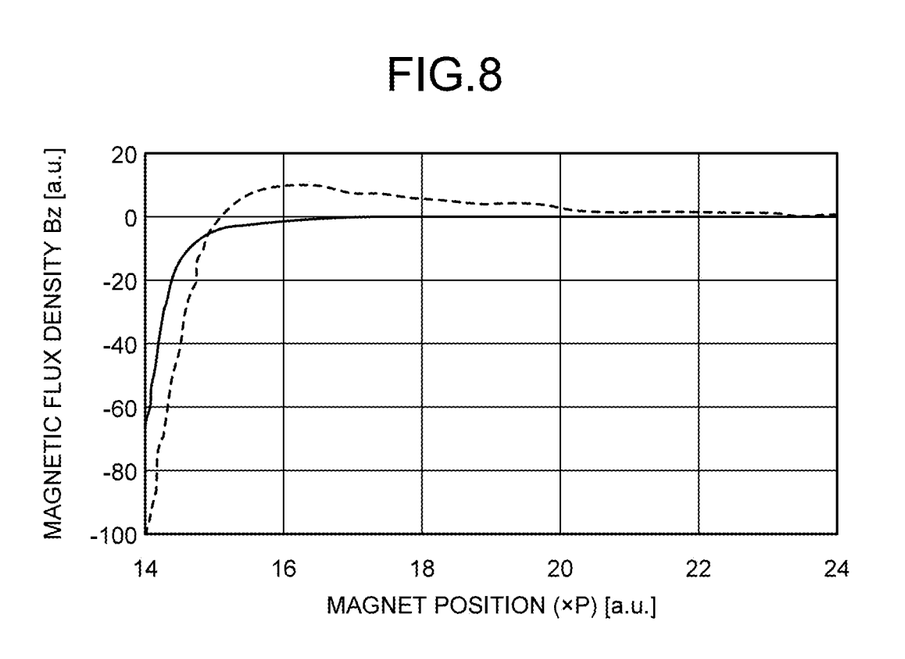
FIG. 8 is a graph illustrating the strength of a magnetic field applied to the magnetic detection element by a position detection magnet unit that is not an object of position detection in the linear transport apparatus according to the first embodiment.

FIG. 8 is a graph illustrating the strength of the magnetic field applied to the magnetic detection element by the position detection magnet unit that is not the position detection target in the linear transport apparatus according to the first embodiment. For comparison, FIG. 8 illustrates, by a broken line, the strength of the magnetic field applied to the magnetic sensing element by the position detection magnet unit that is not the position detection target in the linear transport apparatus not including the side magnetic shielding portions, the back magnetic shielding portions, and the substrate-side magnetic shielding portion. Taking note of one of the magnetic detection elements, it is shown that the position detection magnet unit of the linear transport apparatus not including the side magnetic shielding portions, the back magnetic shielding portions, and the substrate-side magnetic shielding portion applies a magnetic field of about 9% of that at the center of the position detection magnet unit to that magnetic detection element when the position detection magnet unit is located 2P away from the one magnetic detection element out of the range of position detection. When the position detection magnet unit of the carrier that is the position detection target, is placed in the 0P position relative to the above one magnetic detection element while the position detection magnet unit of the carrier that is not the position detection target approaches the carrier that is the position detection target and is placed in the 16P position, therefore, a 9% error component is superimposed on the magnetic detection element by the position detection magnet unit of the carrier that is not the position detection target.

On the other hand, FIG. 8 illustrates, by a solid line, the strength of the magnetic field applied to the magnetic detection element 221 by the position detection magnet unit 12 that is not the position detection target in the linear transport apparatus 100 according to the first embodiment. In the linear transport apparatus 100 according to the first embodiment, the position detection magnet unit 12 hardly applies the magnetic field to the magnetic detection element 221 when placed outside the range of 0P to 14P relative to the magnetic detection element 221 focused on. Even when the carrier 1 that is not the position detection target approaches the carrier 1 that is the position detection target, therefore, the magnetic field generated by the magnets 121 of the position detection magnet unit $12_2$ of the carrier 1 that is not the position detection target does not affect the accuracy of position detection of the carrier 1 that is the position detection target.

For the linear transport apparatus 100 according to the first embodiment, even when the space between the carrier 1 that is the position detection target and the carrier 1 that is not the position detection target becomes small, the magnetic force from the position detection magnet unit $12_2$ of the carrier 1 that is not the position detection target is blocked by the side magnetic shielding portion 122, the back magnetic shielding portion 123, and the substrate-side magnetic shielding portion 223, and hence does not reach the magnetic sensing element 221. It is thus possible to prevent a decrease in the accuracy of position detection of the carrier 1 that is the position detection target.

Second Embodiment

Figure 9:
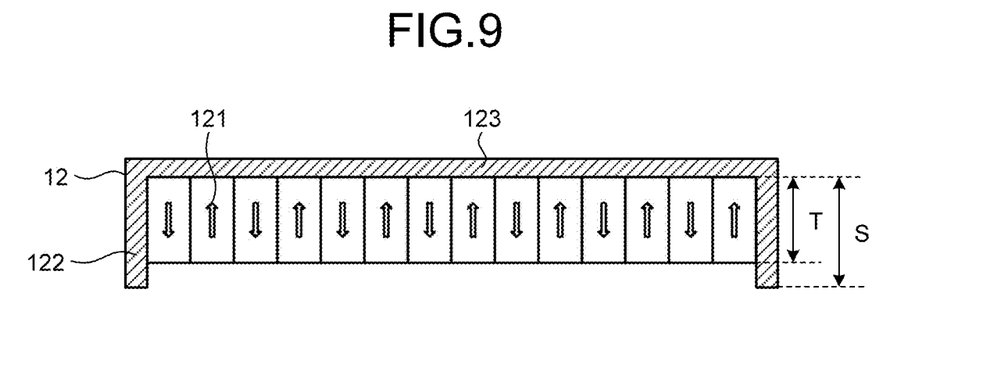
FIG. 9 is a side view of a position detection magnet unit of a position detector of a linear transport apparatus according to a second embodiment.

FIG. 9 is a side view of a position detection magnet unit of a position detector of a linear transport apparatus according to a second embodiment. In the linear transport apparatus 100 according to the second embodiment, the length S of the side magnetic shielding portions 122 is larger than the thickness T of the magnets 121 in the direction from the front side to the back side of the magnets 121 perpendicular to the transport direction of the carriers 1. That is, the linear transport apparatus 100 according to the second embodiment differs from the linear transport apparatus 100 according to the first embodiment in that the side magnetic shielding portions 122 installed at the ends of the position detection magnet unit 12 in the transport direction of the carriers 1 protrude beyond the magnets 121 toward the transport rail 2.

In the linear transport apparatus 100 according to the second embodiment, the side magnetic shielding portions 122 installed at the ends of the position detection magnet unit 12 in the transport direction of the carriers 1 protrude beyond the magnets 121 toward the transport rail 2. As a result, the magnetic force from the position detection magnet unit 12 of the carrier 1 that is not the position detection target is more easily blocked by the side magnetic shielding portion 122. Thus, in the linear transport apparatus 100 according to the second embodiment, the position detection magnet unit 12 generates a magnetic field outward in a narrower range in the transport direction of the carriers 1 than in the linear transport apparatus according to the first embodiment. Thus, as compared with the linear transport apparatus 100 according to the first embodiment, the linear transport apparatus 100 according to the second embodiment can prevent a decrease in the accuracy of position detection of the carrier 1 even when the carriers 1 come closer to each other.

Third Embodiment

Figure 10:
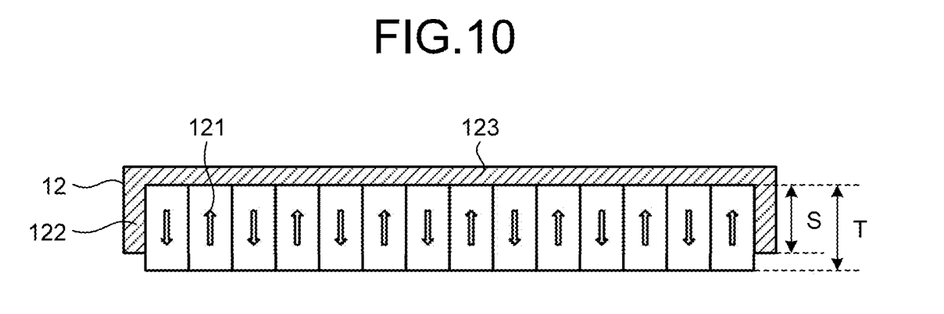
FIG. 10 is a side view of a position detector of a linear transport apparatus according to a third embodiment.

FIG. 10 is a side view of a position detector of a linear transport apparatus according to a third embodiment. The linear transport apparatus 100 according to the third embodiment differs from the linear transport apparatus 100 according to the first embodiment in that the magnets 121 protrude toward the transport rail 2 beyond the side magnetic shielding portions 122 installed at the ends of the position detection magnet unit 12 in the transport direction of the carriers 1. In other words, in the linear transport apparatus 100 according to the third embodiment, the length S of the side magnetic shielding portions 122 is smaller than the thickness T of the magnets 121 in the direction from the front side to the back side of the magnets 121 perpendicular to the transport direction of the carriers 1.

In the linear transport apparatus 100 according to the third embodiment, when the carrier 1 tilts along the transport direction, the interval between the position detection unit 22 and one of the side magnetic shielding portions 122 provided at opposite ends of the position detection magnet unit 12 is reduced. In the linear transport apparatus 100 according to the third embodiment, the magnets 121 protrude toward the transport rail 2 beyond the side magnetic shielding portions 122 of the position detection magnet unit 12. Thus, even when the carrier 1 tilts in the transport direction, it is possible to prevent the side magnetic shielding portions 122 from contacting the position detection unit 22.

Figure 11:
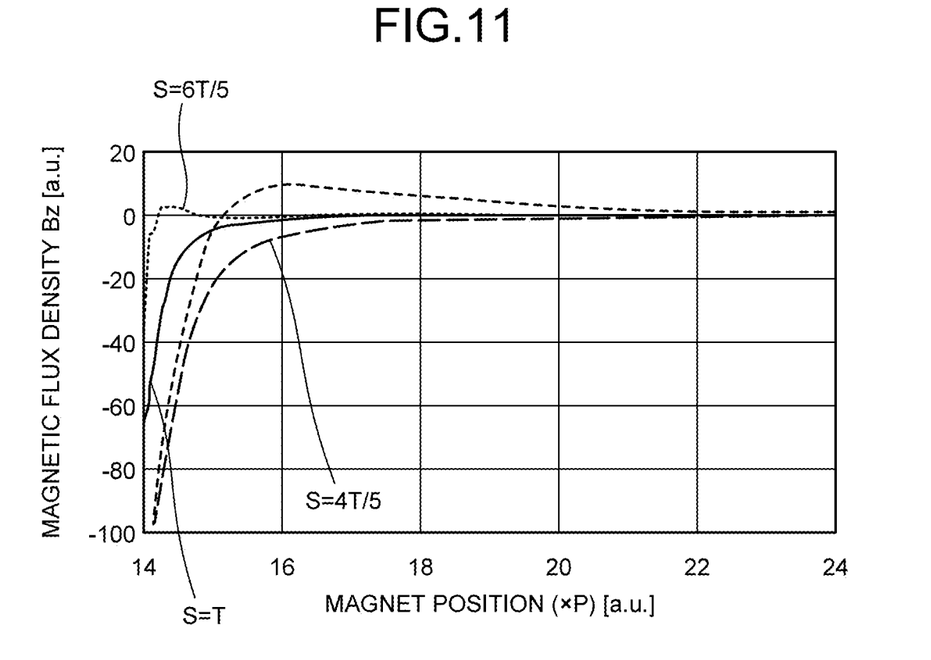
FIG. 11 is a graph illustrating the strength of a magnetic field applied to a magnetic detection element by a position detection magnet unit that is not an object of position detection in the linear transport apparatus according to each of the first embodiment, the second embodiment, and the third embodiment.

FIG. 11 is a graph illustrating the strength of the magnetic field applied to the magnetic detection element by the position detection magnet unit that is not the position detection target in the linear transport apparatus according to each of the first embodiment, the second embodiment, and the third embodiment. In the linear transport apparatus 100 according to the first embodiment, the thickness T of the magnets 121 and the length S of the side magnetic shielding portions 122 have the relationship S=T. In the linear transport apparatus 100 according to the second embodiment, the thickness T of the magnets 121 and the length S of the side magnetic shielding portions 122 have the relationship S=6T/5. In the linear transport apparatus 100 according to the third embodiment, the thickness T of the magnets 121 and the length S of the side magnetic shielding portions 122 have the relationship S=4T/5. A solid line in FIG. 11 indicates the strength of the magnetic field applied to the magnetic detection element 221 by the position detection magnet unit 12 that is not the position detection target in the linear transport apparatus 100 according to the first embodiment. A dotted line in FIG. 11 indicates the strength of the magnetic field applied to the magnetic detection element 221 by the position detection magnet unit 12 that is not the position detection target in the linear transport apparatus 100 according to the second embodiment. A dot-and-dash line in FIG. 11 indicates the strength of the magnetic field applied to the magnetic detection element 221 by the position detection magnet unit 12 that is not the position detection target in the linear transport apparatus 100 according to the third embodiment. For comparison, FIG. 11 illustrates, by a broken line, the strength of the magnetic field applied to the magnetic detection element by the position detection magnet unit that is not the position detection target in the linear transport apparatus not including the side magnetic shielding portions, the back magnetic shielding portions, and the substrate-side magnetic shielding portion.

In the linear transport apparatus not including the side magnetic shielding portions, the back magnetic shielding portions, and the substrate-side magnetic shielding portion, when the position detection magnet unit of the carrier that is not the position detection target is placed in a position closer to the carrier that is the position detection target than the 22P position that is a position 8P away from the magnetic sensing element, the magnetic field of the position detection magnet unit of the carrier that is not the position detection target is applied to the magnetic detection element. In contrast, if the position detection magnet unit 12 of the carrier 1 that is not the position detection target is placed in a position of 16P or beyond in the linear transport apparatus according to the first embodiment, 15P or beyond in the linear transport apparatus according to the second embodiment, and 18P or beyond in the linear transport apparatus according to the third embodiment, the magnetic field is not applied to the magnetic detection element 221. Furthermore, the strength of the magnetic field applied to the magnetic detection element 221 by the position detection magnet unit 12 of the carrier 1 that is not the position detection target is smaller than that of the linear transport apparatus not including the side magnetic shielding portions, the back magnetic shielding portions, and the substrate-side magnetic shielding portion. Thus, even when the carrier 1 that is not the position detection target approaches the carrier 1 that is the position detection target, the linear transport apparatus 100 according to each of the first embodiment, the second embodiment, and the third embodiment can prevent the effect on the accuracy of position detection of the carrier 1 that is the object of position detection, and can prevent a decrease in position detection accuracy even when the carriers 1 approach each other.

Fourth Embodiment

Figure 12:
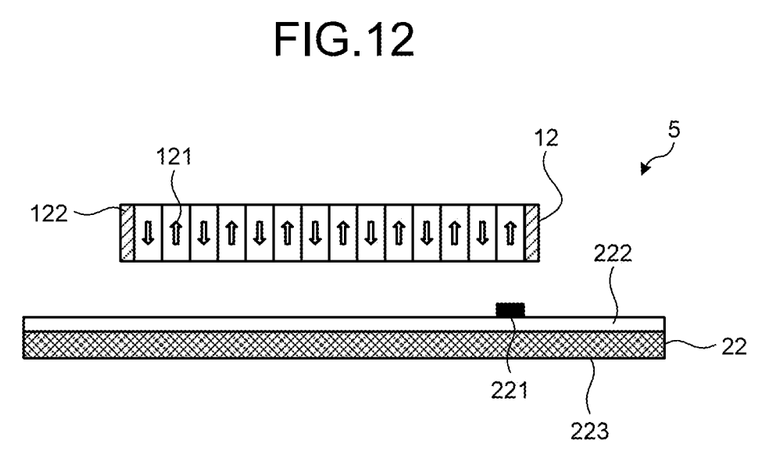
FIG. 12 is a cross-sectional view taken along a carrier transport direction of a linear transport apparatus according to a fourth embodiment.

FIG. 12 is a cross-sectional view of a linear transport apparatus according to a fourth embodiment taken along a carrier transport direction. The linear transport apparatus 100 according to the fourth embodiment differs from the linear transport apparatus 100 according to the first embodiment in that the position detection magnet unit 12 is not provided with the back magnetic shielding portion 123.

The linear transport apparatus 100 according to the fourth embodiment includes the side magnetic shielding portions 122, and thus can block a magnetic field having magnetic lines of force forming small loops that tends to affect the accuracy of position detection of the carrier 1 that is the position detection target. On the other hand, although it is not possible to block a magnetic field which would otherwise be blocked by the back magnetic shielding portion 123, a magnetic field to be blocked by the back magnetic shielding portion 123 is a magnetic field having magnetic lines of force forming large loops, and thus less affects the accuracy of position detection of the carrier 1 that is the position detection target than a magnetic field having magnetic lines of force forming small loops that is blocked by the side magnetic shielding portion 122. Furthermore, the substrate-side magnetic shielding portion 223 installed on the back side of the processing substrate 222 can block a magnetic field having magnetic lines of force forming large loops before that magnetic field is applied to the magnetic detection element 221. Thus, even when the carrier 1 that is not the position detection target approaches the carrier 1 that is the position detection target, the linear transport apparatus 100 according to the fourth embodiment can prevent the effect on the accuracy of position detection of the carrier 1 that is the position detection target, and can prevent a decrease in position detection accuracy even when the carriers 1 approach each other.

The configurations described in the above embodiments illustrate an example of the subject matter, and can be combined with another known art, and can be partly omitted or changed without departing from the gist.

For example, the substrate-side magnetic shielding portion 223 in the above embodiments have been described as being installed over the entire back surface of the processing substrate 222, but the substrate-side magnetic shielding portion 223 only needs to be installed on the back side of the processing substrate 222, opposite the magnetic sensing elements 221 disposed on the front side of the processing substrate 222. For example, when installed on the back side of the processing substrate 222, the substrate-side magnetic shielding portion 223 can be installed partly on the back side of the processing substrate 222 only at positions opposite the magnetic detection elements 221 disposed on the front side of the processing substrate 222 with the processing substrate 222 interposed therebetween. Alternatively, the substrate-side magnetic shielding portion 223 can be installed partly on the back side of the processing substrate 222 around the magnetic sensing elements 221 including positions opposite the magnetic sensing elements 221 disposed on the front side of the processing substrate 222 with the processing substrate 222 interposed therebetween. Even with such a configuration, the linear transport apparatus 100 and the position detector 5 can prevent the effect on the accuracy of position detection of the carrier 1 that is the position detection target even when the carrier 1 that is not the position detection target comes close to the carrier 1 that is the position detection target. Further, the linear transport apparatus 100 and the position detector 5 can prevent a decrease in position detection accuracy even when the carriers 1 approach each other.

The position detection magnet unit 12 in the above embodiments have been described as being provided to the carrier 1 as magnets separate from the mover 11, but the present invention is not limited to this form. For example, some or all of the permanent magnets or electromagnets included in the mover 11 may also serve as the position detection magnet unit 12. Even with such a configuration, the linear transport apparatus 100 and the position detector 5 can prevent the effect on the accuracy of position detection of the carrier 1 that is the position detection target even when the carrier 1 that is not the position detection target comes close to the carrier 1 that is the position detection target. Further, the linear transport apparatus 100 and the position detector 5 can prevent a decrease in position detection accuracy even when the carriers 1 approach each other.

REFERENCE SIGNS LIST 1 carrier; 2 transport rail; 3 control device; 4 linear motor; 5 position detector; 11 mover; 12, $12_1$, $12_2$ position detection magnet unit; 21 stator; 22 position detection unit; 50 linear transport system; 100 linear transport apparatus; 121 magnet; 122 side magnetic shielding portion; 123 back magnetic shielding portion; 221 magnetic sensing element; 222 processing substrate; 223 substrate-side magnetic shielding portion.

The invention claimed is:

1. A position detector comprising:
   a position detection magnet unit configured to be installed at each of a plurality of carriers that are configured to be equipped with a mover; and
   a position detection unit configured to be installed at a transport rail that is configured to be equipped with a stator, wherein
   the position detection magnet unit includes a plurality of magnets disposed such that different magnetic poles are arranged alternately in a transport direction of the carriers, and side magnetic shielding portions installed at ends of the position detection magnet unit in the transport direction of the carriers,
   the position detection unit includes a processing substrate disposed in parallel to the transport direction of the carriers, a plurality of magnetic detection elements disposed side by side in the transport direction of the carriers on a front side of the processing substrate, the front side being a surface facing the carriers, and a substrate-side magnetic shielding portion opposite the magnetic detection elements, the substrate-side magnetic shielding portion being installed on a back side of the processing substrate, the back side being a surface opposite to the front side that is the surface facing the carriers,
   each of the plurality of magnets is magnetized such that magnetic poles of the magnets are aligned in a direction perpendicular to the processing substrate, and
   the magnets located at opposite ends of the plurality of magnets in the transport direction of the carriers are different from each other in polarity of magnetic poles facing the processing substrate.

2. The position detector according to claim 1, wherein the plurality of magnets have a front side and a back side opposite to the front side, the front side being a surface facing the transport rail, and the position detection magnet unit includes a back magnetic shielding portion installed covering the back side of the plurality of magnets.

3. The position detector according to claim 2, wherein the side magnetic shielding portions protrude beyond the plurality of magnets toward the transport rail.

4. A linear transport apparatus comprising the position detector according to claim 3, wherein
the movers and the stator form a linear motor.

5. The position detector according to claim 2, wherein the plurality of magnets protrudes beyond the side magnetic shielding portions toward the transport rail.

6. A linear transport apparatus comprising the position detector according to claim 5, wherein
the movers and the stator form a linear motor.

7. A linear transport apparatus comprising the position detector according to claim 2, wherein
the movers and the stator form a linear motor.

8. The position detector according to claim 1, wherein the side magnetic shielding portions protrude beyond the plurality of magnets toward the transport rail.

9. A linear transport apparatus comprising the position detector according to claim 8, wherein
the movers and the stator form a linear motor.

10. The position detector according to claim 1, wherein the plurality of magnets protrudes beyond the side magnetic shielding portions toward the transport rail.

11. A linear transport apparatus comprising the position detector according to claim 10, wherein
the movers and the stator form a linear motor.

12. A linear transport apparatus comprising the position detector according to claim 1, wherein
the movers and the stator form a linear motor.

\* \* \* \* \*